CLERICAL COLLAR

Original Filed Sept. 8, 1960 2 Sheets-Sheet 1

INVENTOR
Johanna C. Gleeson
By Shoemaker and Mattare
ATTORNEYS

INVENTOR
Johanna C. Gleeson
By Shumaker and Mattare
ATTORNEYS

United States Patent Office

Re. 25,999
Reissued Apr. 26, 1966

25,999
CLERICAL COLLAR

Johanna Christina Gleeson, 1 Down St. Mews, Piccadilly, London, England

Original No. 3,068,486, dated Dec. 18, 1962, Ser. No. 54,725, Sept. 8, 1960. Application for reissue Nov. 30, 1964, Ser. No. 429,938
3 Claims. (Cl. 2—129)

Matter enclosed in heavy brackets [ ] appears in the original patent but forms no part of this reissue specification; matter printed in italics indicates the additions made by reissue.

This invention relates to collars of the clerical type, generally known as "Roman" collars These collars are commonly made of linen, Celluloid or plastic material, folded lengthwise, one or both folds being attachable to the neck-band of a shirt by means of studs or tabs allowing its detachment for washing when desired, and the outer fold being exposed outside the neckband. In some cases, the "Roman" collar is worn with a supporting stock, comprising a flap portion which fits loosely over the front of the shirt and has its own neck-band upon which the folded collar is fitted; the rear ends of this band are attached by a stud to the neck-band of the shirt over which the stock is worn. There is also a type of stock, known as the "military" stock or "rabat," having a double neck-band, the folded collar being placed over the inner band, while the outer band is divided centrally to leave a gap of desired length, allowing the full height of the collar to be seen at the front.

The present invention has for its main object to provide a garment having an integral neck band which is formed with two opposed sleeve-like pockets spaced apart from one another into which the ends of a strip of linen, Celluloid or like material can be inserted, leaving the middle portion of the strip displayed at the gap between the mouths of the pockets.

Another object of the invention is to provide a neck band securable to a garment, said neck band being formed with a pair of opposed, sleeve-like pockets spaced apart from one another into which the ends of a strip of linen, Celluloid or like material can be inserted, leaving the middle portion of the strip displayed at the gap between the mouths of the pockets.

Other objects and advantages of the invention will hereinafter appear from the following description given with reference to the accompanying drawing, in which.

Figure 1:
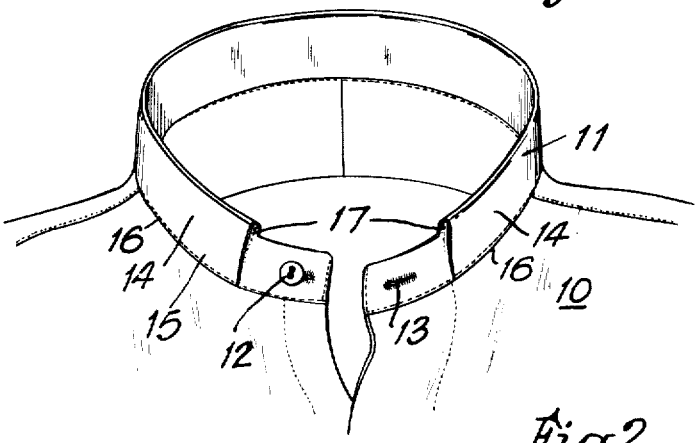
FIG. 1 is a partial front view of the shirt on the neck band of which the collar is to be detachably secured, the neck band being shown as unfastened.

As shown in FIG. 1, the shirt 10 is provided with a neck band 11, the adjacent ends or tabs of which can be fastened together by a button 12 engageable conventionally with a button-hole 13 on the respective ends or tabs. The neck band is made of inverted U-section, with its outer portion 14 turned down over the main inner portion of the band, and the lower edge 15 of this outer portion stitched as at 16 to the base of the main portion and to the underlying top edge of the shirt. There are thus provided two sleeve-like pockets 17 *formed of two connected layers of material* which extend partly around the neck, only the front ends or mouths of the pockets being open. When the shirt is fastened by means of the button 12 and button-hole 13, the mouths of the two pockets 17 will face one another, with a gap between them of a length of about one and a half inches, for example.

Figure 2:
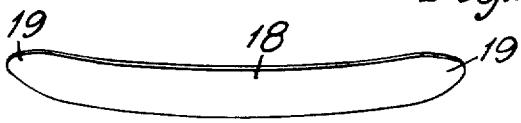
FIG. 2 represents the collar to be secured to this band after the latter has been fastened.

The collar 18, as shown in FIG. 2, is made of a single curved strip of stiff but flexible material, having its edges rounded, if desired, and the surface being impressed with a pattern to simulate linen. The ends 19 will be conveniently tapered or rounded to facilitate their insertion in the pockets 17 of the neck band 11; the overall length of the strip may be for example nine and a half inches, its width or height about one and three-eighths inches, and the ends 19 being of approximately semi-circular shape. To suit a collar of these dimensions, the pockets 17 of the neck band will then be about one and a half inches in height, with a gap of about one and a half inches between their adjacent mouths when the band is fastened by the button 12.

Figure 3:
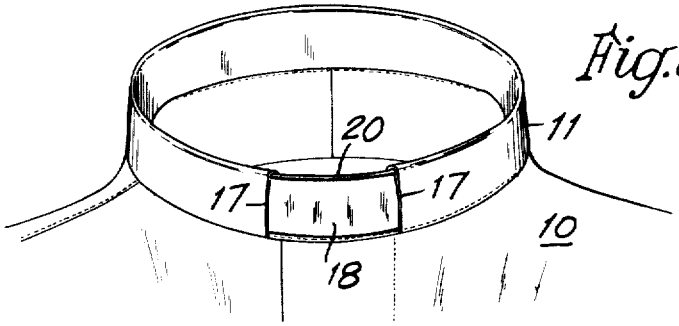
FIG. 3 shows the shirt with its neck band fastened and the collar secured in place thereon.

As seen in FIG. 3, the collar 18, when inserted in the two sleeve-like pockets 17 to approximately equal lengths, will be partially displayed at the gap 20 between the two mouths of the pockets 17, the internal length of each pocket being at least four inches to allow for the reception of the respective end of the strip forming the collar 18.

The collar, though flexible to allow its insertion in place, is made of sufficient stiffness to retain its curvature and to remain in position after insertion, so that there is no need for it to be attached by a stud at the front of the shirt; the neck band 11 can therefore be fastened by a button and button-hole connection as described, or alternatively by a stud, without need for the usual front collar stud to secure the collar.

In all cases, the neck band 11 of the shirt may be stiffened in any suitable manner so that it will retain its curvature prior to insertion and will then stand up to the desired height.

Figure 4:
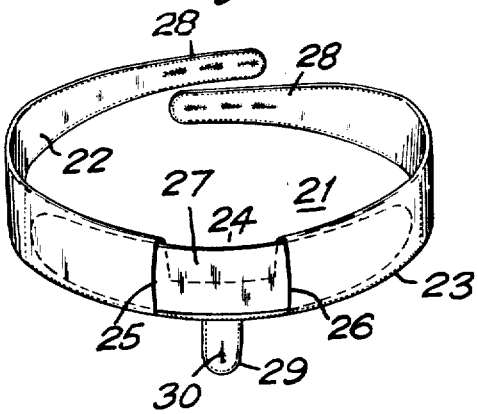
FIG. 4 represents the improved collar mounted upon a support attachable to the neck-band of an ordinary shirt.

In the form of embodiment shown in FIG. 4, the support 21, adapted for attachment as by studs or tabs to an ordinary shirt having a fly-front with buttons or like fastenings, comprises two connected folds *or layers* of material 22, 23, having a gap 24 in the middle of the outer fold 23, which provides two opposed sleeve-like pockets 25, 26, one on each side of the gap; into the open mouths of these pockets there are inserted the ends of a strip 27 made of Celluloid or starched linen, for example, this strip being sufficiently stiff to hold the support 21 upright and being itself curved to suit the shape of the neck-band of the shirt. The support may decrease in depth towards the back, beyond the pockets, the two end portions 28 of the support being attachable to the neck-band of the shirt by means of a stud, tab or the like.

These rear end portions 28 may be adjustable in relation to one another, so that the support may be made longer or shorter to make the collar looser or tighter, this adjustment being provided for example by two or more stud-holes on each end, allowing these ends to be fastened on the back stud with a varying overlap. The front fastening of the support may be made by means of a stud engaged in the ends of the shirt neck-band and also engaging with a button-hole in the inner fold 22 of the support, or with a tab 29 extending therefrom and formed with a button-hole 30.

The inserted strip 27 forming the collar and the pockets 25, 26 on opposite sides of the front gap 24 may vary in length according to the degree of stiffening desired.

Figure 5:
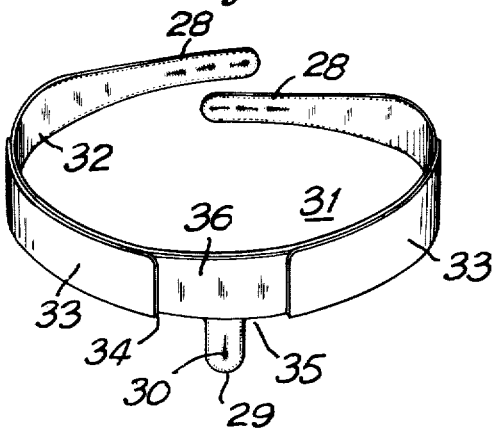
FIG. 5 is a modification, in which the support comprises two folds made of stiff material, the collar being fitted between the two folds.

In the modification shown in FIG. 5, the support 31, also adapted for attachment to an ordinary shirt or like garment, comprises two folds *or layers* of relatively stiff material, marked 32, 33, these two folds being connected together at the lower edge 34. The inner fold 32 extends for the whole length of the support, but the outer fold 33 is divided to leave a gap 35 at the front, where the collar strip 36 will be visible, this strip being inserted downwardly between the two folds, and being retained in place by the stiffness of the support and also by the grip due to its curvature. As in the previous cases, the middle portion of the strip will be clearly visible from the front, between the edges of the gap 35 in the outer fold.

It will be understood that the invention is not limited to collars for shirts and stocks of standard type, but may be applied to T-shirts, sweaters and like garments. With woven or knitted garments having a stand-up neck band, the latter may be formed with pockets to receive the ends of the collar. The dimensions mentioned above by way of example may obviously be varied. The collar strip 18 may be made of Celluloid, plastic or other suitable material; for example linen may be used, if desired, being starched or otherwise stiffened to maintain its shape.

What I claim is:

*1.* A garment having a fly type front, the garment being provided with a free edge defining a circular opening at the upper central portion thereof, said fly type front comprising overlapping edge portions of the garment securable together by releasable means and terminating at the front of said opening, a circular neck band of inverted U-shaped cross section and formed of one integral piece of woven material, said neck band comprising an outer strip and an inner strip connected at their upper edges by an arcuate bight portion, the heights of said strips being equal, the bottom edges of said strips being sewed together, and to said edge of the opening in the garment, both said strips being of rectangular shape and the same size, the ends of said strips being substantially equally spaced from the edges of the garment and spaced from each other, a tab of generally rectangular configuration integrally woven to each end of the inner strip and extending therefrom to an edge of the garment, the bottom edge of each tab being aligned with the bottom edge of the neck band and sewed to said edge of the opening in the garment, the top edge of each tab being spaced below the top edge of the neck band, one tab overlapping the other tab, releasable means securing the overlapping portions of said tabs together, an elongated substantially rectangular clerical collar composed of a strip of stiff but flexible material, said collar being considerably longer than the space between the ends of said strips, the height of said collar being less than the height of said neck band but greater than the height of said tabs, the ends of said collar extending into the space between said outer and inner strips, the central portion of said collar being impressed with a pattern to simulate linen and completely covering said tabs and the releasable means securing said tabs, said collar being imperforate and maintained in position by friction only, the ends of said collar being tapered so as to facilitate the insertion of same into the space between said strips.

*2. A clerical garment having a fly type front, the garment being provided with a free edge defining a circular opening at the upper central portion thereof, said fly type front comprising overlapping edge portions of the garment securable together by releasable means and terminating at the front of said opening, a circular neck band comprising an outer band and an inner band connected to one another by connecting means, the bottom edges of said bands being sewed together and to said edge of the opening in the garment, both said bands being of generally rectangular configuration and substantially the same size, the ends of said bands being substantially equally spaced from the edges of the edge portions of the garment and spaced from each other, the ends of said bands being free of securement to each other and being adapted to receive the ends of a clerical collar, a tab of generally rectangular configuration integral with each end of the inner band and extending therefrom to the edge of the edge portion of the garment, the bottom edge of each tab being aligned with the bottom edge of the neck band and sewed to said free edge of the opening in the garment, the top edge of each tab being spaced below the top edge of the neck band, one tab overlapping the other tab, and releasable means securing the overlapping portions of said tabs together.*

*3. A garment having a fly type front, the garment being provided with a free edge defining a circular opening at the upper central portion thereof, said fly type front comprising overlapping edge portions of the garment securable together by releasable means and terminating at the front of said opening, a circular neck band comprised of inner and outer layers, the said layers being connected and folded downwardly from upper portions thereof and forming a top edge, bottom edge portions of the layers being sewed together and to said edge of the opening in the garment, both said layers being of generally rectangular shape, ends of said layers being substantially equally spaced from the edges of the garment and spaced from each other, a tab of generally rectangular configuration at each end of the inner layer and extending therefrom to an edge of the garment, the bottom edge of each tab being aligned with the bottom edge of the neck band and sewed to said edge of the opening in the garment with one tab overlapping the other tab, releasable means securing the overlapping tabs together, an elongated clerical collar composed of a strip of stiff but flexible material, said collar being considerably longer than the space between the ends of said layers but of considerably less length than the entire neck band, the height of said collar being less than the height of said neck band, the ends of said collar extending into the space between said outer and inner layers, the central portion of said collar overlying said tabs and said releasable means securing said tabs, said collar removably being maintained in position by friction only.*

References Cited by the Examiner

The following references, cited by the Examiner, are of record in the patented file of this patent or the original patent.

UNITED STATES PATENTS

| | | | |
|---|---|---|---|
| 713,565 | 11/1902 | Hart | 2—141 X |
| 1,017,414 | 2/1912 | Heichelbech | 2—141 X |
| 1,108,796 | 8/1914 | Schell | 2—128 |
| 1,771,101 | 7/1930 | Rubinstein | 2—141 X |
| 2,102,198 | 12/1937 | Dickman et al. | 2—103 X |
| 2,265,808 | 12/1941 | Jacobi | 2—116 |
| 2,800,660 | 7/1957 | Myrick | 2—116 |
| 2,927,326 | 3/1960 | Lacoste | 2—116 |
| 2,934,768 | 5/1960 | Williams | 2—103 |

FOREIGN PATENTS

| | | |
|---|---|---|
| 559,001 | 7/1957 | Belgium. |
| 10,375 | 1912 | Great Britain. |
| 22,084 | 1904 | Great Britain. |
| 344,343 | 3/1931 | Great Britain. |
| 40,626 | 8/1907 | Switzerland. |

JORDAN FRANKLIN, *Primary Examiner.*

J. R. BOLER, *Assistant Examiner.*